United States Patent [19]
Mesh

[11] 3,814,146
[45] June 4, 1974

[54] ELECTRONIC DISPENSING NOZZLE

[75] Inventor: Theodore J. Mesh, Greensboro, N.C.

[73] Assignee: Gilbert and Barker Manufacturing Company, New York, N.Y.

[22] Filed: Mar. 28, 1972

[21] Appl. No.: 238,987

Related U.S. Application Data

[63] Continuation of Ser. Nos. 114,050, Feb. 9, 1971, abandoned, and Ser. No. 734,046, June 3, 1968, abandoned.

[52] U.S. Cl.................. 141/1, 137/82, 137/392, 141/198
[51] Int. Cl............................................. B65b 3/04
[58] Field of Search..................... 141/192–229, 141/1, 46; 137/386, 392, 82; 73/290; 222/20

[56] References Cited
UNITED STATES PATENTS

| | | | |
|---|---|---|---|
| 2,828,782 | 4/1958 | Ripley | 141/219 |
| 2,846,119 | 8/1958 | Robbins | 222/20 |
| 2,910,999 | 11/1959 | Kimberly | 137/386 |
| 2,918,095 | 12/1959 | Shawhan | 141/228 |
| 2,928,409 | 3/1960 | Johnson et al. | 137/82 |
| 3,220,258 | 11/1965 | Rod | 73/290 |
| 3,224,250 | 12/1965 | Ming et al. | 73/290 |
| 3,282,217 | 11/1966 | Slover et al. | 137/392 |

FOREIGN PATENTS OR APPLICATIONS

| | | | |
|---|---|---|---|
| 1,013,186 | 12/1965 | Great Britain | 73/290 |
| 1,036,930 | 7/1966 | Great Britain | 141/227 |

Primary Examiner—Houston S. Bell, Jr.

[57] ABSTRACT

An electronic device for automatically controlling the delivery of fluid by a fluid dispenser into a receptacle utilizing a fluid sensing device preferably placed on the dispensing nozzle which is stimulated to vibrate at its natural frequency so that the vibrations can be employed to generate an electrical signal of commensurate frequency. The generated signal is then introduced to responsive circuitry that will open or permit opening of the dispenser valve to allow fluid to pass through the nozzle so long as the sensing device vibrating frequency remains unchanged and into the receptacle but will close the valve to terminate fluid flow when the sensing device vibrating frequency is altered.

10 Claims, 10 Drawing Figures

PATENTED JUN 4 1974
3,814,146
SHEET 1 OF 3
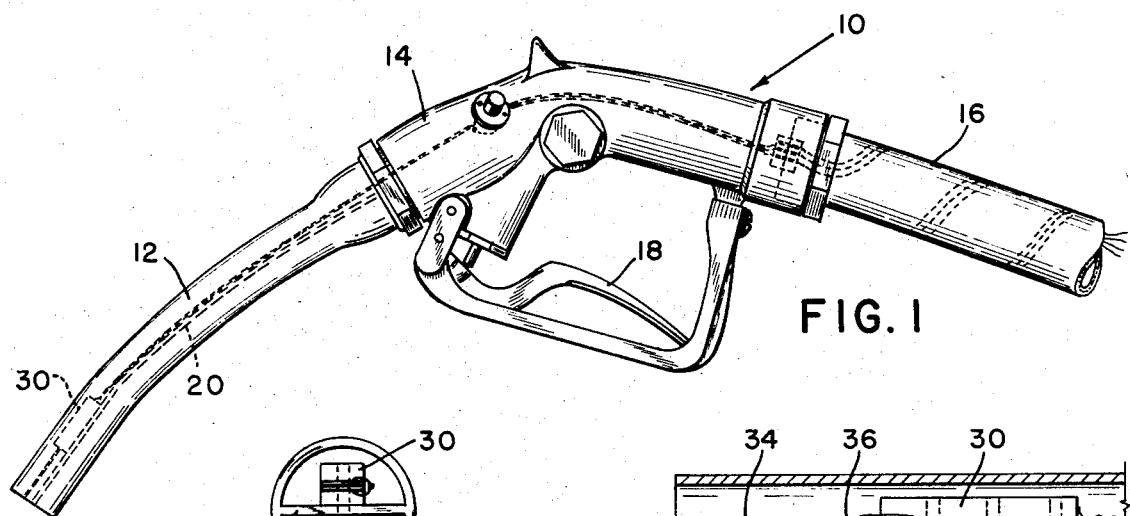
FIG. 1
FIG. 4
FIG. 3
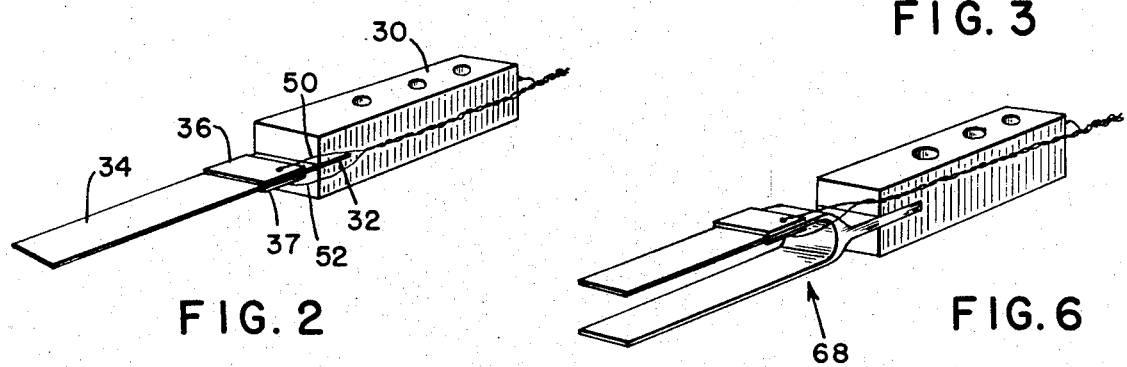
FIG. 2
FIG. 6
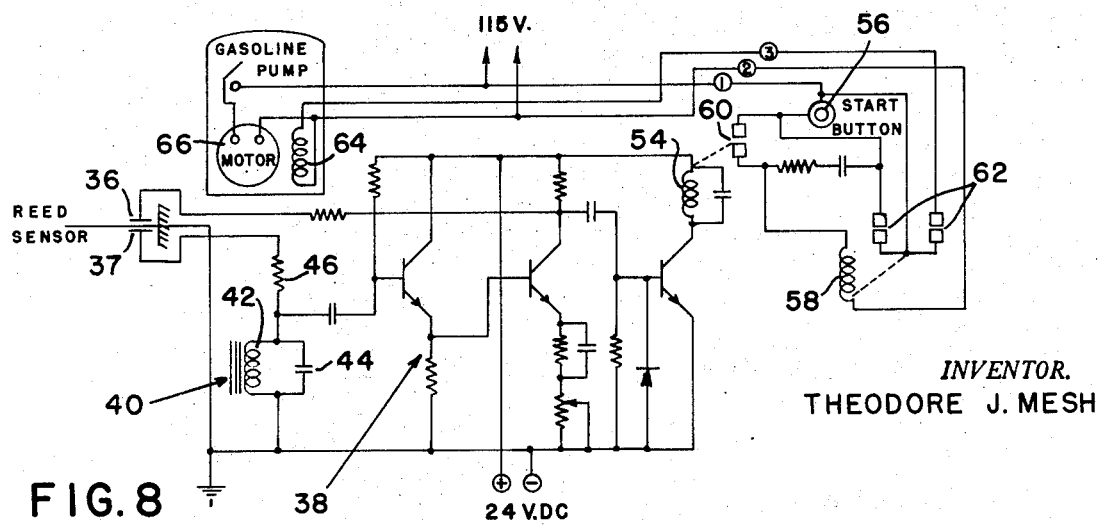
FIG. 8
INVENTOR.
THEODORE J. MESH

INVENTOR.
THEODORE J. MESH

ELECTRONIC DISPENSING NOZZLE

This application is a continuation of application Ser. No. 114,050 filed Feb. 9, 1971, now abandoned, and a continuation of Ser. No. 734,046 filed June 3, 1968, now abandoned.

BACKGROUND, BRIEF SUMMARY AND OBJECTIVES OF THE INVENTION

A frequent problem in dispensing fluid such as gasoline, fuel oil, kerosene and the like, is the overflow often experienced while filling automobile fuel tanks, the overflow occurring when the tank is filled and fuel surges outwardly through the opening and onto the surrounding pavement or attendant. This problem is particularly acute in a crowded service station area when the attendant is simultaneously supervising other services, administering gas to customers, and watching the pump computer to insure that the precise amount of fuel requested by the customer is delivered. While a number of mechanical devices are now in use for automatic delivery control with fuel pump dispensing systems, these devices are not fully satisfactory and do not permit "full tank" filling without occasional overflow or premature shutoff.

Conventional mechanical automatic devices often cause an early termination in delivery of fuel by responding to the foam created within the tank rather than the true liquid level. The foam is often formed within the automobile fuel tank because of the aspirating nature of most nozzles used in gasoline dispensers, and as a result of the foam and premature dispenser shutdown, the customer's tank is not completely filled and must be "topped off" by the attendant with incremental quantities of fuel to complete delivery.

Mechanical devices have conventionally been used for nozzle control of fuel dispensing primarily because safety requirements prohibit using an electric control device operating at an appreciable power level at the nozzle itself. Power levels of greater than 1 watt cannot be tolerated and previously there has been no satisfactory way of transmitting power to an explosion proof valve or solenoid from the nozzle of the dispenser. The possibility of a spark igniting the dispensed fuel is an ominous threat to operational safety.

The present invention is an intrinsically safe device which will sense or detect the presence of fluid so that the dispensing operation may be automatically controlled. It has been found that a sensing element adapted to vibrate at its natural frequency can be mounted on or in the nozzle so that the fuel, as it rises in the automobile fuel tank will eventually make contact with this vibrating device. A segment of piezoelectric ceramic is used which has the property of expanding or contracting slightly as a voltage is applied to its surface. Thus the ceramic will have a tendency to lengthen and shorten so that when it is bonded to the surface of the sensing device, that device will experience a slight bending. If the driving source is an alternating voltage, the sensing device will bend in first one direction and then in the other. This driving AC voltage can be imposed at a frequency equal to that of the natural frequency of the reed so that a very appreciable vibration occurs with only a minimum voltage necessarily applied across the plate. Thus the operational power level is easily within the intrinsically safe limits required in such an operation.

In order to utilize the movement of the sensing device to establish a control signal, a second piezoelectric ceramic is applied to the opposite face of the device which will then act as a generator and produce a voltage usually 25 to 50 percent of that used to drive the device. The frequency of the generated voltage is necessarily the vibrating frequency of the sensing device.

When the small generated voltage is fed into one or more simple amplifier circuits, a gain of up to or exceeding 100 may be achieved, and this voltage can be usefully applied to control the valve operating solenoid of the dispenser.

When the liquid level rises so that the reed is immersed in gasoline, the reed's natural frequency is lowered by 20 percent or more which, in turn, causes the generated voltage to be changed in frequency by the same amount. This change in frequency caused by contact with fluid forms the operational basis of the control device and provides for an automatic termination of fluid delivery in the manner more particularly described hereinafter.

It has been found advantageous to use a parallel tuned circuit to control the signal developed from the vibrating reed and piezoelectric ceramic across the following amplifier stages of the apparatus, that circuit being resonant at approximately the natural vibrating frequency of the sensing reed. Thus when the reed vibrates at its natural frequency, i.e., it is not immersed in fluid, the resonant circuit's impedance is at a maximum which permits a full signal to be developed at the input stage of an amplifier. By this arrangement, usable signal is developed through the amplifying stages which can be used to energize a coil and close contacts included in a separate power circuit. This power circuit is served by a conventional voltage source and operates the valve-controlling solenoid to either initiate or terminate fluid delivery through the valve in the dispenser.

It has been found desirable to provide the system with a slowdown feature which includes in the dispenser a by-pass valve of smaller capacity than the valve used for normal delivery. When the fuel is foamed or splashed upwardly in the tank during the high volume portion of the delivery, it is very likely to contact the sensing reed and terminate delivery by the process just described. Since this foam will vanish once delivery has ceased, the fluid level, once the fuel is without foam and turgidity within the tank, will not likely contact the sensing reed. In that event, the reed will recommence vibration at its natural frequency and generate an electrical signal as previously described to again operate or permit the operation of the valve-controlling solenoid in the power circuit. Delivery of fuel is reinstituted this time through a smaller by-pass valve. During this delivery, the fuel level rises very calmly and slowly until it then engulfs the reed, alters its vibrating frequency, and delivery is completed.

With this summary in mind, an objective of the present invention is to provide an electronic control device for a dispensing nozzle which will terminate fluid delivery when the dispensed fluid contacts a sensing element.

Another object of the present invention is to provide a control device of the type described which embodies a sensing element capable of initiating an electrical signal of a given frequency which will be altered upon contact of the element with a fluid.

Yet another object of the present invention is to provide a control device of the type described which embodies components capable of initially terminating fluid delivery when the fluid surges in the fill pipe or tank, subsequently reinitiating delivery at a slower rate until the receptacle is completely filled, and finally terminating delivery.

Yet still another further object of the present invention is to provide a control device of the type described which generates an electrical signal of sufficient magnitude to control the operation of a solenoid valve and includes circuitry to eliminate that signal if the vibrations of the reed sensor or altered because of contact with the fluid.

Yet still another further object of the present invention is to provide a control device of the type described utilizing a reed sensor and piezoids to stimulate the sensor and generate an electrical signal from the vibrations caused by that stimulation.

These and other objects of the present invention will become more apparent after a consideration of the following detailed specification taken in conjunction with the accompanying drawings wherein like characters of reference designate like parts throughout the several views.

FIGURE DESCRIPTION

FIG. 1 is an isolated side elevational view of a dispensing nozzle embodying the present invention and maintaining a push button control unit on the upper accessible surface.

FIG. 2 is a perspective enlarged view of a sensing reed used to detect the presence of fluid proximate the pump nozzle.

FIG. 3 is an enlarged, side elevational, sectional and fragmentary view of the forward end of the dispensing nozzle showing one possible location for the sensing reed.

FIG. 4 is an end elevational view of the forward portion of the dispensing nozzle containing a sensing reed illustrated in FIG. 3.

FIG. 6 is a perspective view of another embodiment of the sensing reed of the present invention incorporating a tuning fork design.

FIG. 8 is a circuit diagram of one embodiment of the control device for mounting on a dispensing nozzle comprising the present invention.

DETAILED DESCRIPTION OF THE INVENTION

Figure 5:
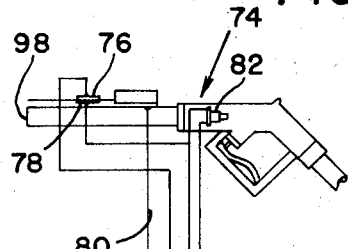
FIG. 5 is another embodiment of a dispensing nozzle showing an extruded passage along the upper surface of the nozzle to retain and house the sensing reed of the present invention.

Referring now to the drawings and particularly to FIG. 1, a conventional dispensing nozzle shown generally as 10 forms the basic structure for carrying the components of the present invention and has a barrel portion 12 and a base 14 to which is connected a flexible hose 16 extending to a dispenser (not shown). An actuating trigger 18 will initiate fluid delivery from the dispenser through the hose 16, the base 14 and the nozzle 12 into a receptacle possibly in the form of a vehicle fuel tank.

To accommodate the elements required to operate the dispenser automatically, a baffle 20 forms a platform upon which some elements may be secured. Another possible nozzle configuration is shown in FIG. 5 and designated generally as 22, this configuration permitting a larger passageway 24 for fuel delivery because of an extruded upper channel 26 along the top of the barrel 28 in which some control elements may be placed. While any number of nozzle barrel configurations are possible, the barrel 12 shown in FIGS. 1, 3 and 4 will be used by way of illustration in the following description.

The present invention has been developed about the principle that minimal immersion in or contact by fluid of a vibrating element will cause a change in that element's vibration frequency and/or amplitude sufficient to control other circuit components and ultimately the dispensing of fluid such as gasoline and the like. Consisting of novel circuitry responsive to change of frequency or signal magnitude upon contact by the vibrating element with liquid to control other circuit elements, the specific application of the frequency change principle to a control device placed on a dispensing nozzle is a decided advance because the device can function at extremely low and safe power levels. The obvious danger of a spark within equipment handling gasoline has made prior attempts to develop an electronic control device unsuccessful.

In order to provide a reliable vibrating element, it has been found advantageous to utilize a reed 34 made of, for example, phosphor bronze and supported in cantilever fashion as shown particularly in FIG. 2. A supporting block 30 which may be formed of brass is provided with a slot 32 within which the reed 34 is inserted. A suitable size for the reed has been found to be approximately 1¼ inches long and about five-sixteenths inch wide with the thickness maintained at 0.02 inch. In order to achieve optimum vibration characteristics, a block 30 of about 1½ inches in length has proven successful.

Bonded to each side of the reed 34 near the support block 30 are two sections of piezoelectric ceramic 36 and 37 each of which have the well known property or characteristic of expanding or contracting slightly as voltage is applied to the ceramic surfaces which are preferably silvered. When an alternating voltage is applied to one of the ceramic segments hereinafter referred to as a piezoid, voltage in one direction will cause an expansion of the piezoid while a voltage of reverse polarity will cause contraction, this activity thus inducing a slight bending of the reed first in one direction and then in the other. The piezoids 36 and 37 are bonded to the reed using epoxy resin on which a bit of silver flake has been positioned near the center of the piece. Tight clamping during cure of the resin establishes electrical contact between the reed and the ceramic's silvered face and produces a very thin glue line.

If the alternating voltage used to drive the piezoid 36 is adjusted to the natural frequency of the reed 34, a very appreciable vibration will occur with only 2 or 3 volts across one plate, and this vibration can be detected with the driving voltage as low as one-half volt. Thus the required power level at the reed is easily within the intrinsically safe limits required for use near a volatile substance such as gasoline.

Since one piezoid 36 can be driven to contract and expand by an alternating voltage to vibrate the reed 34, the second piezoid 37 can act as a generator and will produce an alternating voltage of approximately 25 to 50 percent of the voltage used on the driver piezoid 36 with the same frequency. The phasing or timing of the generated pulses with respect to the driving voltage can be controlled by attaching the appropriate sides which control the polarity to the corresponding side of the reed. When a transistor amplifier generally designated 38 in FIG. 8 having a gain of about 100 is connected to amplify these generated pick-up voltage signals, the signals may be used to control subsequent circuitry and may also be fed back to the driver plate to continue the in-phase oscillations or vibrations of the reed 34.

When the system is at rest and power has been applied, any small disturbance in the immediate surrounding of the reed such as a noise or slight wind will cause the reed to vibrate very slightly at its natural frequency of for example 500 vibrations per second. These very minute vibrations will generate a small output voltage in the piezoid 37 at the same frequency, and if this generated signal is now amplified 100 times and applied back to the driving piezoid 36, the vibration amplitude of the reed 34 will increase rapidly and will continue indefinitely provided proper phase relationships exist between the pick-up and the driving voltages. Thus a driving system has been provided to vibrate the reed 34 at its natural frequency.

The system as described can be used for fluid control, but when a sensor such as the reed 34 shown in FIG. 2 is used in a liquid medium, the amplifier gain is critical in that with too much gain, it will continue to vibrate at the natural frequency of the reed even when the reed is completely immersed in fluid. Immersion of the reed in fluid such as gasoline or the like will, for example, lower the natural vibrating frequency of the reed by 20 percent or more, and a 500 cycle reed when immersed in a fluid may continue to vibrate, assuming the gain is excessive, at around 400 cycles or less because the pick-up alternating voltage is now generated at this frequency.

The preferred operational mode is that which will cause the vibrations of the reed to be altered and/or to cease with as little as one-eighth inch of the reed immersed in fluid, and detection of this vibration change is accomplished through a tuned LC circuit in the pick-up circuitry as shown in FIG. 8 and generally designated 40. A small choke coil 42 and a capacitor 44 are resonantly tuned at the natural vibrating frequency of the reed with a resistor 46 preceding the circuit and completing the network to the reed. When the reed is out of fluid and is vibrating at its natural frequency, the tuned circuit is at resonance and therefore appears as a very high shunting resistance which does not appreciably reduce the generated signal strength. In the event the pick-up is immersed in fluid, the generated voltage frequency is lowered and the pick-up voltage is reduced significantly because of the smaller vibration amplitude in a fluid for a given power input. Additionally, the tuned circuit is no longer operating at resonance and will have a much less voltage developed across it at the lower frequency. Finally, the resonant circuit's impedance has been lowered, and the circuit is loaded to reduce further the signal. A phase shift also occurs which acts to apply the driving pulses at something other than optimum timing.

Thus it can be seen that all of the above factors will combine to cause a sudden cessation of vibration with only a small portion of the reed immersed in the fluid whereas withdrawal of the reed from the fluid will then result in an immediate restart of the system. The use of the resonant circuit avoids the critical problem of gain control and wetness of the probe so that a hanging drop of fluid on the reed will have little or no effect.

The reed 34 and block 30 are mounted near the end 48 of the nozzle, and two leads 50 and 52, in addition to the usual groundwire (not shown) are brought back through the base 14 and along the hose 16. These may be made of steel or other thin, strong conducted material and are preferably embedded and interwound with the covering of the hose in the manner shown in FIG. 1.

One possible control circuit is illustrated in FIG. 8, and as shown therein, the transistor amplifier 38 energizes a coil 54 when reed 34 is vibrating at its natural frequency and a driving voltage is amplified to a usable value. Actuation of the start button 56 will energize the coil 58 of a power relay in the event coil 54 is energized and contacts 60 associated with that coil are closed. Coil 58 remains energized by its own auxiliary contact 62 so long as coil 54 is energized. Therefore, it will be apparent that power can be applied to the dispensing valve solenoid 64 only if, and as long as, the reed 34 is vibrating. The system cannot operate if the reed is damaged in any way and the valve solenoid 64 will become deenergized as soon as liquid touches the reed and varies its vibrating frequency. It is also possible for the energization of coil 58 to control the pump motor 66 as well as the dispensing solenoid valve so that the entire dispensing operation can become automatic and be actuated merely by the closing of a power contact or pushbutton.

Figure 9:
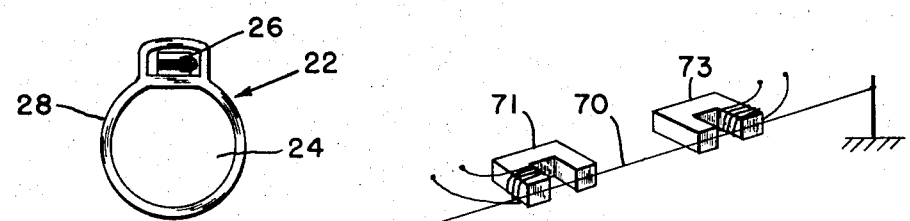
FIG. 9 is a circuit diagram of another embodiment of the control device comprising the present invention.

An additional and equally effective embodiment of the present electronic nozzle control system is shown in the circuit diagram of FIG. 9 wherein a pushbutton assembly shown generally as 74 is interconnected with the three conventional connections to the pick-up plate 76, the driver plate 78 and the ground 80. The pushbutton assembly is inserted for control purposely so that when the button 82 is depressed, the circuit is completed and a driver signal or voltage is delivered to transistor 84 which becomes conductive and energizes relay 86 thus closing the contacts 88 and 90 to actuate the flow control solenoid 92.

A driving signal appears at transistor 92 from transistor amplifier 94 so long as the resonant driver signal appears across the tuned circuit 96. Transistor 92 thus acts as a closed switch as long as the reed vibrates at its resonant frequency, and the closed relay contacts 88 supply continuous power to the relay coil 86 even when the pushbutton 82 is released and transistor 84 becomes non-conductive.

When liquid reaches the nozzle tip 98 and vibration is altered, transistor 92 no longer conducts and the relay 86 becomes deenergized thus opening the solenoid flow valve. If the liquid in the fuel tank should subside and the reed be again exposed, reed vibration will resume, though the start button 82 must be pushed to re-initiate flow. Shutdown will occur a second and final time when liquid touches the reed.

This system is also fail safe in that fluid flow cannot be started if the reed is not vibrating, and vibration takes place only if all components are operating properly. No short circuit can start delivery and pushing the start button in the absence of reed vibration has no effect.

Gain in this amplifier circuit is not critical but should, however, be kept below a given value for any particular reed detector, it having been found that a gain value of 50 or below is satisfactory. In the event the system were driven to achieve a gain or several hundred, the reed would likely vibrate even when immersed in heavy liquids. The combination of relatively low gain and resonant tuning to the natural frequency of the reed in the input circuit results in a system which will always start with the reed in air and will continue to vibrate even if drops of gasoline fall on it. However, the system will always stop when a small portion of the reed is immersed in fluid.

While the system described and illustrated functions in response to a frequency change sensed by the resonant circuit, equally effective control over the dispensing operation may be achieved by a critically monitored signal magnitude sensing device. In that instance, the immersion of the vibrating reed in a liquid will diminish or attenuate the signal strength developed from the piezoid and associated apparatus described above. Attenuation of the signal below an established level could, of course, deactivate a holding coil and thus open the pump circuit. The critical signal strength can be easily determined and those values used to provide appropriate coils and contacts for the pump circuit in the event this principle is desired without any circuitry being included to detect a frequency change experienced when the vibrating reed is immersed in liquid.

The present dispensing control system can be constructed to include a slowdown feature such as that disclosed in my pending application Ser. No. 625,897, filed Mar. 1, 1967, wherein a by-pass valve solenoid 100, FIG. 10, of a smaller size than the conventional dispensing valve solenoid 102 is used to provide the last portion of the delivery to avoid computer override and the possible overfill of gasoline. In combining this feature with the present system, a timer of conventional construction may be employed wherein the initial contact by the turbulent fluid foam normally associated with the rapid filling of a container will affect the vibration of the reed and close down the pump operation for a given interval of time. After the time interval has passed, the timer will again apply power to the system so that in the event fluid is not present about the reed, the delivery will be re-initiated this time through the by-pass valve by the energization of a by-pass valve solenoid. Delivery then takes place at much lesser rate than was previously the case until the fluid level again contacts the vibrating reed and shuts down the dispenser entirely.

Figure 10:
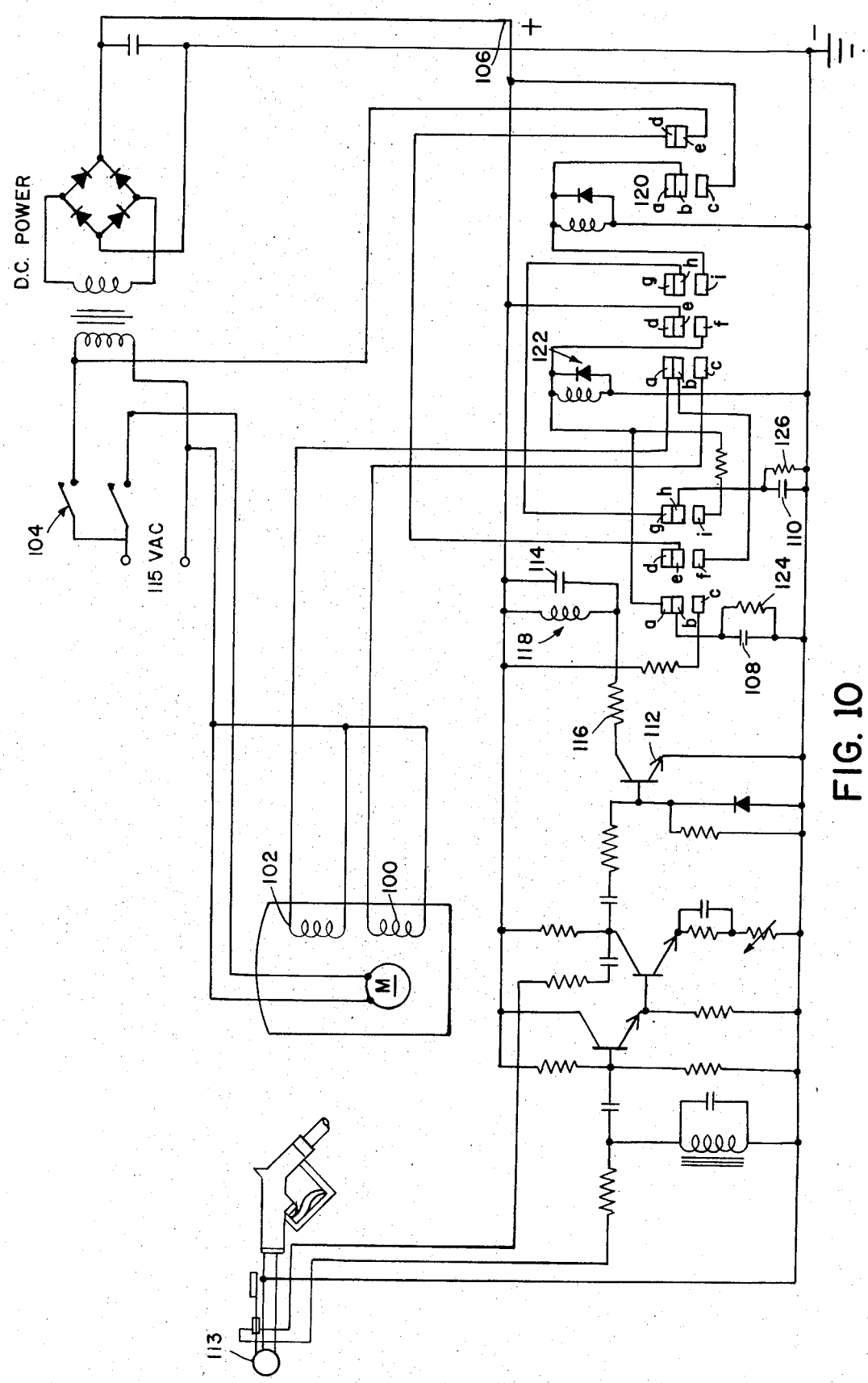
FIG. 10 is a circuit diagram of another embodiment of the control device which incorporates a slowdown feature to provide the last portion of the fuel delivery.

Referring to FIG. 10, initially pump switch 104 is open, pump motor M is stopped, valve solenoids 100 and 102 are open and there is no DC voltage at 106. All relays are open and capacitors 108 and 110 are discharged. When switch 104 is closed for delivery of fluid, pump motor M is activated, a DC voltage appears at 106 and a signal appears at the base of transistor 112 since the nozzle reed 113 is not in contact with the fluid and vibrates. After a selected time delay, caused by required charging of capacitor 114 through resistor 116, relay 118 pulls in. Valve solenoid 102 receives power from the 115 volt line via contacts $d, e$ of relay 120, contacts $e, f$ of relay 118, and contacts $a, b$ of relay 122. Since valve solenoid 102 is the main valve solenoid, delivery can proceed at the maximum rate. Capacitor 108 is charged via contacts $b, c$ of relay 118.

When the tank is nearly full, foam contacts the nozzle vibrating reed and the signal disappears. Relay 118 opens, main valve solenoid 102 closes and flow of the fluid ceases. As relay 118 opens, the charge on capacitor 108 energizes the coil of relay 112 momentarily via contacts $a, b$ of relay 118. Relay 122 pulls in and holds through its contacts $e, f$. Capacitor 110 holds no charge during this operation since relay 122 was not initially energized, and so there was no power flow through contacts $h, i$ of relay 118 to charge capacitor 110.

As foam on the nozzle dissipates, the nozzle reed begins vibrating again, and after a short time delay, relay 118 picks up again. At this time by-pass valve solenoid 100 opens, receiving power through contacts $d, e$ of relay 120, contacts $e, f$ of relay 118, and contacts $b, c$ of relay 122, and fluid delivery begins again and at a low rate through the by-pass valve. Capacitor 110 is charged through contacts $h, i$ of relay 118 and contacts $e, f$ of relay 122.

When the fluid or foam again stops the reed's vibration and the signal disappears again, relay 118 reopens, the charge on capacitor 110 energizes the coil of relay 120 momentarily via contacts $g, h$ of relay 118 and contacts $h, i$ of relay 122, pulling in relay 120 momentarily which then holds in by its own contacts $b, c$. Contacts $d, e$ of relay 120 open, disconnecting the AC power from both valve solenoids 100, 102. The system is now locked out until pump switch 104 is opened and later reclosed for the next cycle. The few seconds interval with switch 104 open is sufficient for resistors 124 and 126 to discharge capacitors 108 and 110. All relays now have dropped out and the system is reset for the next cycle.

Figure 7:
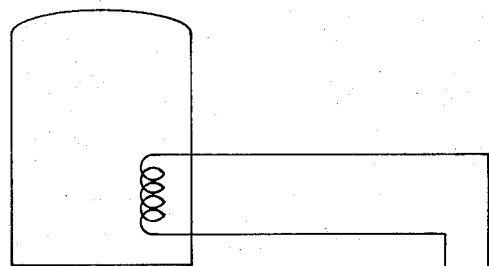
FIG. 7 is yet another embodiment of a sensing device for the present invention shown as a wire of a predetermined length mounted for vibration having a magnetic driver and pickup associated therewith.

While a single flat reed has been shown for use as the sensing element, additional reeds are obviously compatible with the present electronic control device, one of which is tuning fork shaped, shown in FIG. 6, and generally designated 68. It is also possible to employ a predetermined length of wire such as shown in FIG. 7 and indicated as 70 surrounded by small electromagnets 71 and 73, one of which 71 drives the wire at its natural frequency while the other 73 generates a pick-up voltage when the wire moves in the established magnetic field. Any number of vibrating elements are obviously available and there is no intent to be limited to any particular configuration in the present invention.

While there has been described in detail two embodiments of an electronic control device for automatically controlling the delivery of fluid by a dispenser, it will be obvious to one skilled in the art that a number of changes may be made in the sensing device, the frequency control circuit, the amplifying circuit and the power control circuit as well as other phases of the present concept without departing from the real spirit and purpose of this invention. Such changes and alterations as well as the use of equivalents are contemplated.

What is claimed is:

1. A device for automatically controlling the delivery of fluid by a fluid dispenser through a valve and a flexible hose and into a receptacle, said device comprising: a portable dispensing nozzle secured to an end of the flexible hose, said nozzle including a barrel portion and an actuating trigger for initiating fluid delivery from the dispenser, said barrel portion including means defining a fluid flow path and a chamber shielded from inlet fluid flow, fluid sensing means mounted within said chamber and fixed relative to said nozzle portion, said fluid sensing means oscillating at a first frequency when remote from fluid and oscillating at a differing frequency when fluid within the receptacle backs up into said chamber and contacts the oscillating sensing means, said fluid sensing means generating an electrical signal commensurate with the oscillating frequency, and means responsive to the generated signal opening said valve to permit fluid to flow through the nozzle and closing the valve responsive to the differing frequency to terminate fluid flow through the nozzle.

2. A device as claimed in claim 1, said fluid sensing means including a piezoid generating said electrical signal commensurate with the oscillating frequency.

3. A device as claimed in claim 1, said valve opening means including a solenoid selectively opening the valve, circuit means coupling said signal generating means with said solenoid, and means selectively completing said circuit means to energize said solenoid and operate the valve.

4. A device as claimed in claim 3, said signal generating means including a piezoid operable with said fluid sensing means.

5. A device as claimed in claim 3, said circuit means including a relay having power contacts closing in response to energization of the relay by the generated electrical signal, power source, a normally open starter switch and a solenoid power circuit including said power contacts and said starter switch connecting said power source with a solenoid, whereby the generated signal energizes the relay and closes the power contacts to permit selective energization of the solenoid by the power source when the starter switch is closed.

6. A device as claimed in claim 5, said stimulating means comprising an alternating voltage source and a separate piezoid responsive to the alternating voltage.

7. A device as claimed in claim 5, further comprising means responsive to a frequency change in the fluid sensing means eliminating the generated signal at the valve opening means to close the valve and terminate fluid delivery.

8. A device as claimed in claim 1, wherein the fluid dispenser has a by-pass flow valve and a by-pass flow valve control associated therewith and initial fluid contact with the fluid sensing means has eliminated the electrical signal means at the valve opening means to close the valve and terminate delivery initially, said nozzle further comprising: means re-establishing the generated electrical signal at the valve opening means after a preselected time interval in the event there is no fluid contact with the fluid sensing means; and means actuating the by-pass flow valve control to open the by-pass flow valve in response to the electrical signal at said valve opening means so that fluid is dispensed through the by-pass flow valve to the nozzle at a reduced rate until the dispensing operation is terminated by further fluid contact with the fluid sensing means and the resulting elimination of the generated electrical signal at said valve opening means.

9. The method of controlling flow of fluid from a dispenser through a valve and nozzle and then to a receptacle comprising the steps of: positioning the nozzle having fixed therein a sensing means at a desired level within the receptacle and remote from fluid; vibrating the sensing means at a first frequency; dispensing fluid through the nozzle while shielding said sensing means from inlet fluid flow; vibrating the sensing means at a differing frequency when the fluid level within the receptacle rises and backs up within the nozzle and contacts the sensing device; generating an electrical signal commensurate with the vibrating frequency of the sensing device; terminating fluid flow by closing the valve when fluid contacts the shielded sensing means and varies the frequency.

10. The method of controlling flow of fluid from a dispenser through a valve and nozzle and then to a receptacle comprising the steps of: positioning the nozzle having a sensing device fixed therein at a desired level within the receptacle and remote from fluid; shielding said sensing device from inlet fluid flow; vibrating the sensing device at a selected frequency; generating an electrical signal commensurate with the vibrating frequency of the shielded sensing means; applying the generated signal to a valve controlling solenoid to operate the valve and initiate fluid flow from the dispenser through the nozzle to the receptacle; directing the flow of fluid into the receptacle and until the fluid level backs up into the nozzle and contacts and alters the vibrating frequency of the sensing device so that the solenoid in the valve is again operated to terminate fluid flow at the desired level.

* * * * *